United States Patent [19]

Van De Mark

[11] Patent Number: 4,830,772

[45] Date of Patent: May 16, 1989

[54] STRIPPER COMPOSITION FOR REMOVAL OF PROTECTIVE COATINGS

[75] Inventor: Michael R. Van De Mark, Rolla, Mo.

[73] Assignee: Hoechst Celanese Corporation, Chatham, N.J.

[21] Appl. No.: 205,143

[22] Filed: Jun. 10, 1988

[51] Int. Cl.$^4$ .......................... C11D 7/00; C11D 7/26; C11D 7/24

[52] U.S. Cl. .................................. 252/170; 252/171; 252/DIG. 8; 134/38; 134/42

[58] Field of Search ................. 252/170, 171, DIG. 8; 134/38, 42

[56] References Cited

U.S. PATENT DOCUMENTS

| | | | |
|---|---|---|---|
| Re. 27,432 | 7/1972 | Torrenzano et al. | 252/DIG. 8 |
| 2,495,728 | 1/1950 | Hutson et al. | 252/DIG. 8 |
| 2,495,729 | 1/1950 | Hutson et al. | 252/DIG. 8 |
| 2,916,366 | 12/1959 | Heinrich et al. | 44/69 |
| 2,968,638 | 1/1961 | Meckler | 252/DIG. 8 |
| 3,702,304 | 11/1972 | Esposito | 252/171 |
| 3,743,542 | 7/1973 | Cooper et al. | 252/171 |
| 4,392,000 | 7/1983 | Ryckaert et al. | 252/171 |

*Primary Examiner*—Paul Lieberman
*Assistant Examiner*—Ronald A. Krasnow
*Attorney, Agent, or Firm*—Depaoli & O'Brien

[57] ABSTRACT

Stripper compositions for coatings comprise an aromatic hydrocarbon, an aliphatic alcohol, and trioxane. Xylene and methanol are the preferred solvents. A useful composition for use at room temperature is 33% xylene, 33% methanol, and 33% trioxane. Trioxane slurries at ambient temperature are also useful for hot dip stripping when heated to a temperature which causes the trioxane to be dissolved.

10 Claims, No Drawings

STRIPPER COMPOSITION FOR REMOVAL OF PROTECTIVE COATINGS

BACKGROUND OF THE INVENTION

1. Field of the Invention

This invention relates to compositions for removing or stripping paint, varnish, and like coatings from wood and metal surfaces.

2. Review of the Prior Art

Removal of protective coatings from wood and metal surfaces has long been a difficult and laborious operation involving the use of flame, heat, and/or chipping tools. Such labor has been minimized by using solvents to soften and/or lift a coating from a protected surface. Compositions for removing protective coatings have generally utilized methylene chloride and other halogenated aliphatic hydrocarbons.

Paint and varnish removers are of two main types according to method of use: application removers and immersion removers. Application removers are usually applied by brushing or spraying and are used for small jobs or for items that cannot be immersed. Immersion removers are used as either cold or hot baths where it is practical and cost efficient to install equipment that can strip numerous items. Cold baths contain solvents such as methylene chloride, and hot paths often contain caustic soda.

As disclosed in U.S. Pat. No. 2,495,729, aliphatic alcohols or cyclic aliphatic oxides, such as tetramethylene oxide, are mixed with an aliphatic acid ester, such as ethyl acetate in acetone, and a surface active agent, such as a long chain alkylbenzene sulfonate, and are effective for vertical surfaces because a film-forming base material, such as wax, cellulose nitrate, and cellulose acetate, is added to increase the viscosity and form a protective film which enables the solvent and softening agents to be confined within the film to exert maximum softening and solvent action. The composition includes methylene chloride as the preferred sole active organic solvent plus a second component such as benzene, methanol, and acetone to form preferred binary mixtures.

U.S. Pat. No. 3,179,609 describes compositions useful for removing coatings and finishes such as paints, varnishes, lacquers, shellac, gums, and natural and synthetic resins.

U.S. Pat. No. 3,538,007 discloses a paint stripper comprising 54–77 parts of chlorinated liquid hydrocarbon solvent, 1–4 parts of carboxylic acid having 1–4 carbons, 1–6 parts of propargyl alcohol, 0–2 parts of non-ionic wetting agent, 0–15 parts of liquid aromatic hydrocarbon solvents, 0–6 parts of a coupling agent, 0–30 parts of phenol or alkyl substituted phenol, 0–2 parts of a thickener, and 0–2 parts of an evaporation retarder. The aromatic liquid hydrocarbon can be benzene, toluene, or xylene.

U.S. Pat. No. 3,574,123 describes a paint stripper comprising 50–90 parts of a chlorinated liquid hydrocarbon solvent, 2–15 parts of a lower aliphatic alcohol or glycol ethers, 0.1–15 parts of a lower carboxylic acid, 2–30 parts of hydroxybenzenes, 2–10 parts of a fatty acids sulfonate or a salt of a fatty amine carboxylic acid, and 0.1–10 parts of aqueous ammonium bifluoride. This composition can also contain inert organic aromatic hydrocarbon solvents such as benzene, toluene, xylene, ethylbenzene, otho-ethyltoluene, di-ethylbenzene, and isopropyl benzene, the lower alkyl substituted benzenes boiling at 170° F. and higher being preferred.

U.S. Pat. No. 3,592,691 describes the removal of photo resist mask residuals from a semiconductor substrate by immersing the substrate in a photoresist solvent and heating the solvent at 150°–250° C. and at a pressure of about 300 psig for a time period of ¼–3 hours. The solvent composition comprises trichloroethylene, isopropanol, and xylene with up to a few percent of methylene chloride. The isopropanol may be replaced wholly or partially with lower boiling point aliphatic alcohols such as ethanol.

U.S. Pat. No. 3,743,542 describes a method for removing paint from metal surfaces by boiling a solvent or solvent mixture and contacting the painted metal surface with the vapors of the solvent mixture, preferably while refluxing the vapors in a closed system. It is especially useful for removing durable paints such as those based on vinyl, acrylic, or epoxy resins. The stripping composition comprises hydrogenated aromatic solvents and aliphatic alcohols.

U.S. Pat. No. Re 27,432 is directed to a process for removing polymeric materials from processing equipment. It teaches numerous solvents known for dissolving vinyl halides such as trimethylene oxide, tetramethyl urea, dimethyl acetamide, tetrahydrofuran, cyclohexanone, cyclopentanone, cyclohexene oxide, diethyl acetamide, methyl ethyl ketone, and dioxane. It also teaches that these solvents vary in dissolution strength with the molecular weight of the compound to be dissolved and that tetrahydrofuran successfully removes both homopolymer and co-polymer contaminants having low or high molecular weights.

U.S. Pat. No. 3,784,477 relates to removal of paints, varnishes, and similar finishes from wood and metal objects without damage to grain or glue joints. It teaches that xylene or aromatic naphthas can be used as an extender for dimethylformamide or dimethyl acetamide, with little change in paint removal activity, and further that xylene can be diluted or extended freely with methyl alcohol up to about 20% of its weight.

U.S. Pat. No. 4,595,396 teaches the solubility of trioxane in methanol, absolute ethanol, and 95% ethanol at temperatures below and above ambient. Such solutions are used for fuel transport and as fuel.

Trioxane-containing lacquer removers for alkyd resins are disclosed in German Offenlegungsschrift No. 2,118,870. They consist of 4–7:1–3 parts diol acetols, such as 1,3-dioxolane, and trioxane for retention of the volatile acetals. They optionally contain ethyl cellulose.

Solutions comprising trioxanes and ethyl acetate for removing alkyd resin coatings are also described in German Offenlegungsschrift No. 2,123,563. They optionally contain ethyl cellulose as a retention agent. An alkyd resin coating treated with a 4:1 mixture of ethyl acetate: trioxane was removable within 0.5 minute after application and hardened (due to solvent evaporation) after 120 minutes, as compared to 0.5 and 50 minutes, respectively, for pure ethyl acetate.

Substantially all currently used strippers contain chlorinated hydrocarbons and particularly methylene chloride which is a potentially harmful solvent. There is accordingly a need for a solvent having fast lifting speed for common coatings which is also harmless to the user.

Accordingly to the "Kirk-Othmer Encyclopedia of Chemical Technology," Vol. 16, p. 763, a typical Methylene Chloride Remover contains 70–85% methylene chloride, 5-10% alcohol, and 0-10% hydrocarbon solvent or ketones, the remainder being paraffin wax, methylcellulose, an amine, and surfactants or emulsifiers.

Because immersion stripping has many practical advantages, there is also a need for a stripper composition for use in hot baths that is less volatile than one based on methylene chloride (b.p.=42° C.), less toxic, and less painful upon skin contact.

SUMMARY OF THE INVENTION

It has surprisingly been discovered that trioxane is a very fast and effective solvent for lifting common coatings and that its solubility parameters can be modified by admixing an aromatic hydrocarbon and an aliphatic alcohol. Suitable aromatic hydrocarbons include benzene, toluene, xylenes, and ethylbenzene, a xylene or a mixture of xylenes being the preferred aromatic solvent. Other alkylbenzenes, such as di-ethylbenzene, isopropyl benzene, otho-ethyltoluene, trimethylbenzenes, and cumene are reasonably satisfactory, if the alkane end is not more than a $C_5$ hydrocarbon, to form a liquid composition which is an effective coatings stripper.

The aliphatic alcohol may be selected from the group consisting of methanol, ethanol, isopropanol, n-propanol, and butanol, the solubility of trioxane being progressively less in this series. Methanol is the preferred solvent.

In commercial use, the composition is suitably further modified by adding waxes or oils to reduce evaporation and by adding thickeners to reduce flow so that it can be used for vertical surface stripping.

The preferred composition for use at ambient temperatures is approximately 33% methanol, 33% xylene, and 33% trioxane. The content of trioxane can be lowered, but doing so increases the time required for removal of coatings. At ambient temperatures, the solubility of trioxane is about 35% by weight. However, to provide a margin of safety in the event that the temperature drops, 33% is preferred. This coatings stripper is less dense than the methylene chloride strippers and is 66% water soluble.

Trioxane is more like methylene chloride in structure than is dioxane, dimethylformamide, tetrahydrofuran, or tetramethylene oxide. Methylene chloride, however, is very low on hydrogen bonding as compared to trioxane. In the solvent composition of this invention, more aromatics are consequently needed to counterbalance the hydrogen bonding of trioxane. The wetting ability of the alcohol is needed to add a proton donor for hydrogen bonding.

This paint stripper composition is useful for removing or stripping a wide variety of coatings such as paints, varnishes, enamels, lacquers, and the like, and more particularly neoprenes, polyesters, polycarbonates, silicon elastomers, phenolics, vinyl halide polymers and copolymers, acrylates, and polyvinyl alcohol coatings at ambient temperatures. It is particularly suitable for alkyd, latex, and urethane paints and for varnishes.

The compound, 1,3,5,-trioxane, is commonly referred to as trioxane or trioxymethylene. Trioxane as used herein is a cyclic trimer of formaldehyde having the structural formula below:

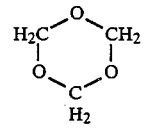

When trioxane is dissolved in methanol and other solvents, heat is absorbed so that the solubility of trioxane in methanol and similar solvents increases with increasing temperature. The solubility of trioxane in methanol is shown in the following table:

TABLE I
SOLUBILITY OF TRIOXANE IN METHANOL

| Temperature, °C. | Wt. % Trioxane in Liquid Phase |
|---|---|
| 0.1 | 14 |
| 10.2 | 21 |
| 18.9 | 31 |
| 25.0 | 37 |
| 30.0 | 44 |
| 40.0 | 60 |
| 64.0 (melting point) | 100 |

The solubilities of chemically pure trioxane in absolute ethanol and in 95% ethanol at various temperatures are approximately as follows:

TABLE II
SOLUBILITY OF TRIOXANE IN ABSOLUTE ETHANOL

| Temperature, °C. | Wt. % Trioxane in Liquid Phase |
|---|---|
| 10 | 12 |
| 15 | 15 |
| 20 | 19 |
| 25 | 25 |
| 30 | 32 |
| 35 | 42 |
| 40 | 52 |
| 45 (too high to determine accurately) | |

TABLE III
SOLUBILITY OF TRIOXANE IN 95% ETHANOL, 5% $H_2O$

| Temperature, °C. | Wt. % Trioxane in Liquid Phase |
|---|---|
| 10 | 16 |
| 15 | 18 |
| 20 | 23 |
| 25 | 28 |
| 30 | 37 |
| 35 | 50 |
| 40 (too high to determine accurately) | |

These data indicate that the solubility of trioxane in absolute or 95 percent ethanol is slightly less at a given temperature than the solubility of trioxane in methanol. However, both ethanol and water can be used as major or minor portions of the solvent in trioxane-methanol compositions. The addition of water to ethanol increases the solubility of trioxane at a given temperature, i.e., water increases the solubility of trioxane in ethanol at a given temperature and reduces the temperature at which a solution of a given concentration can be maintained without crystallization of the trioxane. Water can also be expected to have the same effect when it is a portion of a methanol-trioxane solution.

Stripper compositions based on trioxane can be useful for warm-to-hot baths (35°-60° C.) that offer many of the advantages of conventional immersion-type removers without the disadvantages of volatility and/or causticity. Moreover, mixtures of alcohols can be utilized in such baths to provide low volatility and adequate solvency.

DESCRIPTION OF THE PREFERRED EMBODIMENTS

The invention may be more clearly understood by reference to the following examples which are given on a weight basis.

Example 1

Using a modification of the Crowley methhod to determine the hydrogen bonding capability of trioxane, solutions of trioxane were prepared with 8% and 20% trioxane. This solvent system was used to prepare 0.1M EtOd solutions for FT-IR.

Solution of trioxane in $CH_2Cl_2$ were also prepared at 5%, 10, 15%, and 20% levels and used as the solvent for 0.1M EtOd solutions for FT-IR.

The FT-IR results from between 2750 and 2550 $cm^{-1}$ showed a modest H-bond value, calculated to a Crowley value of about 7.

| Principal Component | Hildebrand | Crowley Values | Dielectric | Dipole Moment |
|---|---|---|---|---|
| Trioxane | ~20 | 7 | 8 | 2 |
| $CH_2Cl_2$ | 19.8 | 1.5 | 9 | 5 |
| Tetrahydrofuran | 20 | — | — | — |
| Dioxane | 20.5 | — | — | — |

Based on these data and numbers in "Solubility Parameters" of the Chemical Rubber Co., trioxane is similar to esters and methylene chloride.

Example 2

A stripper composition was prepared to determine the similarity of trioxane to $CH_2Cl_2$ and its usefulness as a stripper. The composition contained 100 grams trioxane, 100 grams toluene, and 100 grams n-butanol. These materials were mixed and filtered. Endothermic behavior was noted. The solution was then applied to a sample of white paint of unknown composition which was more than 2 years old. The white paint lifted.

Example 3

The composition of Example 2 was tested on a varnish and also resulted in lifting the coating.

Example 4

The composition of Example 2 was additionally applied to an epoxy paint and similarly resulted in lifting.

Example 5

Neat methylene chloride was applied to the paint, varnish, and epoxy coatings of Examples 2, 3, and 4 and also caused lifting but did so more quickly.

Examples 6–12

Six paint stripper solutions, weighing 500 grams, were made up by weight. The trioxane caused a strong endotherm. In addition, the formulation in Example No. 11 was prepared according to German Offenlegungsschrift No. 2,123,563, using ethyl acetate. These formulations are as follows:

| EXAMPLES | COMPOSITIONS |
|---|---|
| 6 | 20% methanol, 80% methylene chloride |
| 7 | 50% xylene, 50% methanol |
| 8 | 50% xylene, 50% n-butanol |
| 9 | 33.3% xylene, 33.3% n-butanol, 33.3% trioxane |
| 10 | methanol at saturation with trioxane |
| 11 | 80% ethyl acetate, 20% trioxane |
| 12 | 33.3% xylene, 33.3% methanol, 33.3% trioxane |

In Example 8, a 50% solution of trioxane in methanol was attempted, but the trioxane was only partially soluble, so that it was considered to be a saturated solution. In Example 9, the trioxane was also not totally soluble and was similarly used as a saturated solution.

Four coatings test samples were prepared on glass panels, as a first set of 48 panels, by using a six mil drawdown blade with commercial paints. The panels were 6 inches by 8 inches. The coatings were allowed to dry for 48 hours and then tested at ambient temperatures. A second set was also dried for 48 hours and then cured in an oven at 120° F. for 7 days before testing at ambient temperature (24°–25° C.). These coatings were an alkyd, a latex, a urethane, and a varnish; they were purchased at a retail outlet.

The alkyd coating was made with Rust Preventative Ace Quick Drying Exterior Enamel Alkyd #197-23 Dutch Orange.

The latex coating was made with Ace-Tone Acrylic Latex Semi-Gloss Enamel #186-114 Sea Green Interior.

The varnish was prepared with McCloskey Heirloom Clear Varnish High Gloss #0092.

The urethane coating was made with Deftane Clear Gloss #1, Polyurethane Finish Interior/Exterior.

When conducting the test for stripping effectiveness, a 2-ml sample of a stripper composition was placed on one of the 12 coated glass panels for each coating and covered with a watch glass while a timer was started. When the film lifted across the drawdown, the timer was stopped, and a time to strip was recorded. The results of the tests on the four coatings in each set are as follows:

| | TIME REQUIRED FOR INDICATED COATING TO LIFT AFTER APPLICATION OF STRIPPER COMPOSITION, SECONDS | | | | | | | |
|---|---|---|---|---|---|---|---|---|
| | Alkyd | | Acrylic Latex | | Varnish | | Urethane | |
| Example No. | 2 days | 1 week[a] | 2 days | 1 week[a] | 2 days | 1 week[a] | 2 days | 1 week[a] |
| 6 | 5 | 10 | 28 | 29 | 5 | 13 | 9 | 10 |
| 7 | 37 | 60 | 100 | 91 | 32 | 56 | 53 | 51 |
| 8 | 100 | 171 | 160 | 300 | 93 | 200 | 140 | 208 |
| 9 | 48 | 110 | 70 | 140 | 39 | 100[b] | 8 | 87 |
| 10 | 93 | 93 | 64 | 120 | 300 | 300 | 80 | 65 |
| 11 | 48 | 48 | 60 | 140[c] | 65[c] | 75[c] | 80 | 160 |

-continued

| | TIME REQUIRED FOR INDICATED COATING TO LIFT AFTER APPLICATION OF STRIPPER COMPOSITION, SECONDS | | | | | | | |
|---|---|---|---|---|---|---|---|---|
| | Alkyd | | Acrylic Latex | | Varnish | | Urethane | |
| Example No. | 2 days | 1 week[a] | 2 days | 1 week[a] | 2 days | 1 week[a] | 2 days | 1 week[a] |
| 12 | 30 | 35 | 33 | 58 | 31 | 46 | 50 | 42 |

Note: All coatings were 6 mil drawdowns on glass matrix.
[a]Allowing 2 days at room temperature followed by one week at 120° F. (Set No. 2)
[b]Not true lift but specks of lift.
[c]No true lift but soft and some spot delamination.

Example 13

A test of an epoxy paint was made by coating two steel panels with a very hard-to-strip epoxy of a proprietary formulation. After curing, the panels were exposed to the solvent compositions of Examples 6 and 12. Neither composition touched the coating in 5 minutes (300 seconds). After 30 minutes, the composition of Example 12 released the coating in part, and the composition of Example 6 loosened the film slightly. Neither did the job well.

Example 14

A stripper composition is made of 33% xylene, 33% n-butanol, and 33% trioxane, as in Example 9, and is heated to 35° C. All of the trioxane appears to be in solution. A piece of wood, coated with an obviously old alkyd paint, is dipped into the warm stripper. Lifting activity is noted promptly.

Example 15

Another stripper composition is prepared with 25% of xylene, 25% of a 95% ethanol/5% water solution, and 50% of trioxane. At 25° C., trioxane should dissolve in a 95.5% ethanol/water solvent to the extent of 28 parts to 100. Assuming that the same solubility holds in this composition, it is 32% xylene, 32% ethanol/$H_2O$, and 36% trioxane. A piece of the same wood coated with the same alkyd paint of unknown age is dipped into the stripper at ambient temperature and lift off is observed within a short time.

Example 16

The composition of Example 15 is heated to 35° C., and a piece of the same painted wood is dipped therein. Lifting of the coating is observed quickly.

Example 17

The composition of Examples 15 and 16 is heated to 45° C., and a piece of the same wood coated with the same alkyd paint is dipped thereinto. Lift off is observed very quickly.

Example 18

The stripper composition of Examples 15-17 is heated to 60° C., and a piece of the same painted wood is dipped thereinto, with lift off being observed immediately.

These crude tests appear to indicate that trioxane can be formulated as a slurry which then can be used at an elevated temperature at which it is in solution. These compositions should therefore be suitable for hot dip usage in a stripper tank.

What is claimed is:

1. A composition for stripping coatings from surfaces, comprising trioxane, said trioxane being present in amounts of at least about 33% by weight of the total composition, an aromatic hydrocarbon, and an aliphatic alcohol.

2. The composition of claim 1, wherein said aromatic hydrocarbon is selected from the group consisting of benzene, toluene, xylenes, ethylbenzene, and alkylbenzenes having an alkane end which is not more than a $C_5$ hydrocarbon.

3. The composition of claim 1, wherein said aromatic hydrocarbon is a xylene or mixtures of xylenes selected from the group consisting off o-xylene, m-xylene, and p-xylene.

4. The composition of claim 1, wherein said aliphatic alcohol is selected from the group consisting of methanol, ethanol, isopropanol, n-propanol, and butanol.

5. The composition of claim 1, wherein said alcohol is methanol.

6. The composition of claim 1, wherein said trioxane is in solution at ambient temperatures.

7. The composition of claim 5, wherein said hydrocarbon is xylene and said trioxane, said xylene, and said methanol are each approximately 33% by weight of said composition.

8. The composition of claim 4, wherein said alcohol is 95% ethanol and 5% water.

9. The composition of claim 1, wherein said trioxane is partially undissolved at ambient temperatures, whereby said composition is in the form of a slurry.

10. The composition of claim 9, wherein said composition is heated to a temperature at which said trioxane is in solution and is useful for hot stripping of highly resistant coatings.

* * * * *